United States Patent [19]

Inoue

[11] 4,453,069

[45] Jun. 5, 1984

[54] EDM PULSE FORMING CIRCUIT ARRANGEMENT AND METHOD

[75] Inventor: Kiyoshi Inoue, Tokyo, Japan

[73] Assignee: Inoue-Japax Research Incorporated, Yokohama, Japan

[21] Appl. No.: 351,532

[22] Filed: Feb. 23, 1982

[30] Foreign Application Priority Data

May 2, 1981 [JP] Japan ................................ 56-67348
Aug. 27, 1981 [JP] Japan ................................ 56-135214

[51] Int. Cl.³ .............................................. B23P 1/08
[52] U.S. Cl. ................................. 219/69 P; 219/69 M
[58] Field of Search ............... 219/69 M, 69 P, 69 C, 219/69 R, 69 S, 69 G

[56] References Cited

U.S. PATENT DOCUMENTS 3,777,108  12/1973  Maillet ............................ 219/69 P
4,017,705   4/1977  Bazhenov et al. .............. 219/69 C Primary Examiner—M. H. Paschall
Attorney, Agent, or Firm—Karl F. Ross; Herbert Dubno

[57] ABSTRACT

An EDM pulse forming circuit arrangement and method employs an oscillator to produce a succession of quantum signal pulses of a pulse duration $\tau$on.q and a pulse interval $\tau$off.q. A gating circuit is used to gate the quantum signal pulses and to turn on and off a power switch in circuit between a DC voltage supply and a gap discharge circuit with the gated quantum signal pulses to develop a train of quantum machining voltage pulses across the machining gap within each time period Ton of the gating pulses. The gap discharge circuit incorporates an impedance such that the quantum voltage pulses of an extremely short duration result in a substantially continuous, unitary and pulsed current flow through the gap within the gated time period Ton, constituting an individual machining electrical discharge of a duration $\tau$on which is substantially equal to the time period Ton.

20 Claims, 20 Drawing Figures

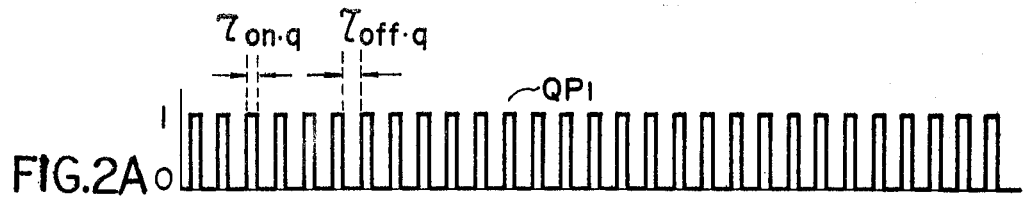
FIG. 2A
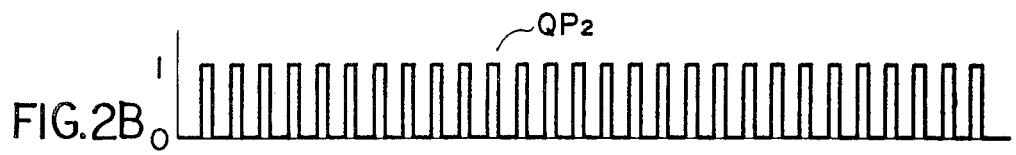
FIG. 2B
FIG. 2C
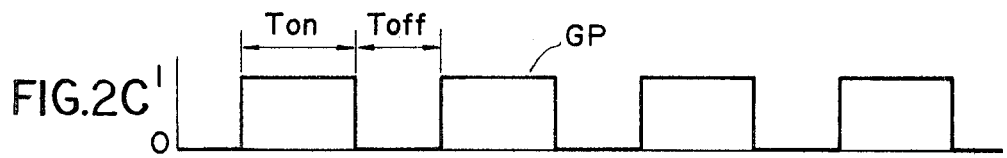
FIG. 2D
FIG. 2E
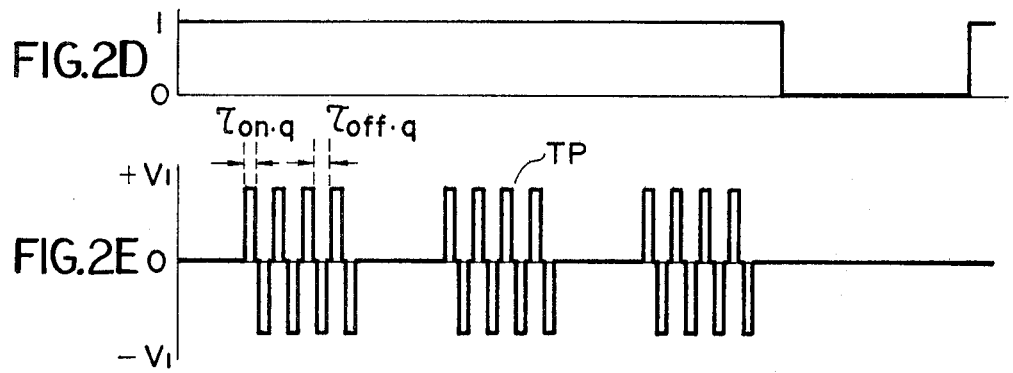
FIG. 2F
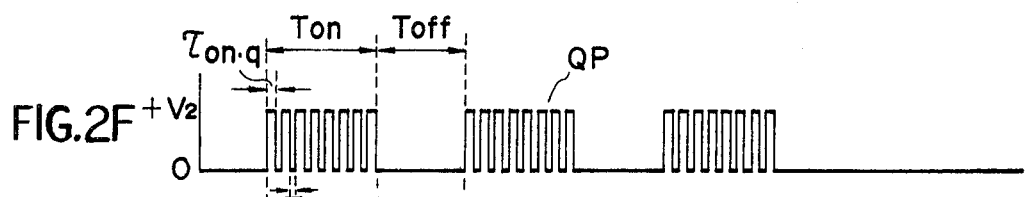
FIG. 2G
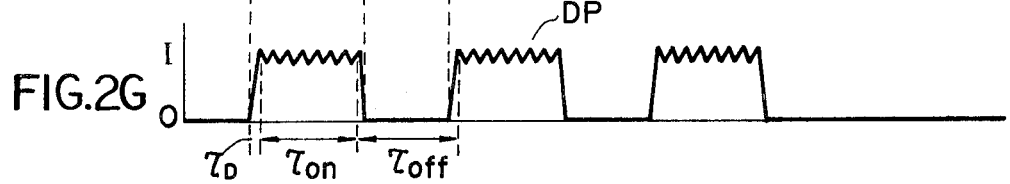

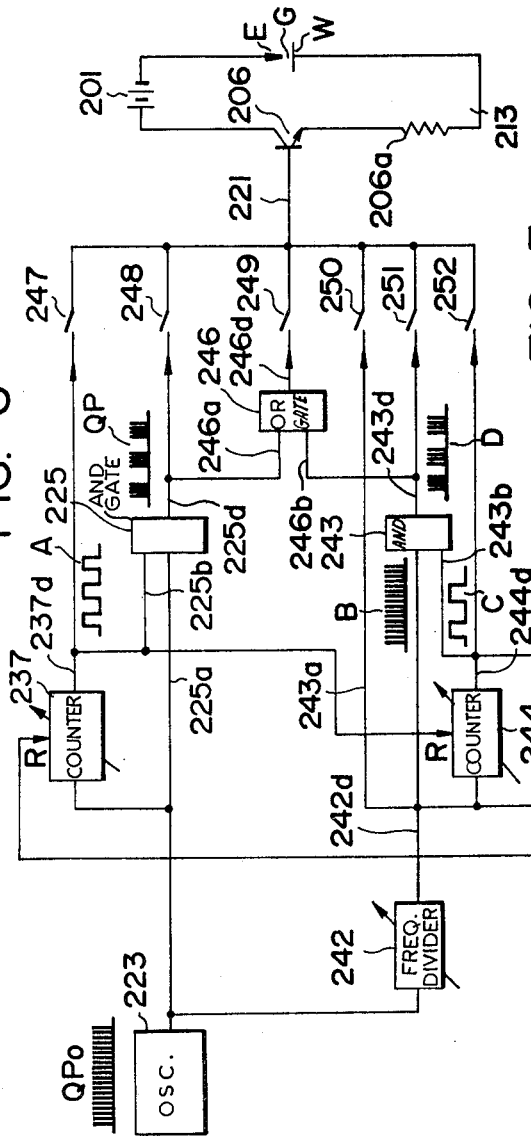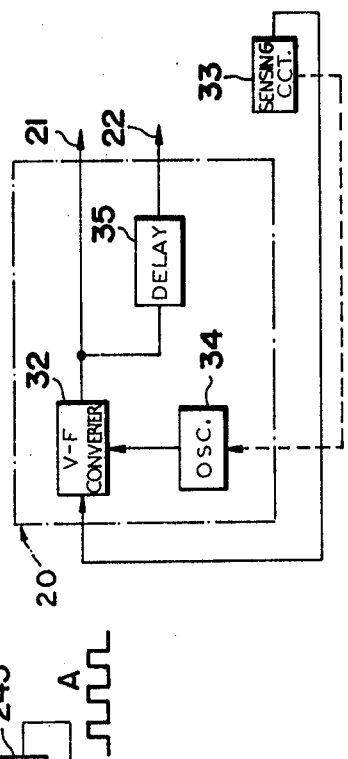

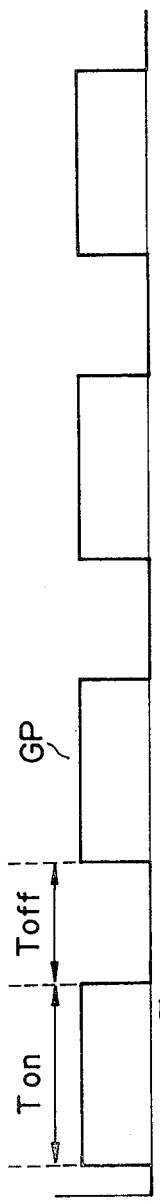
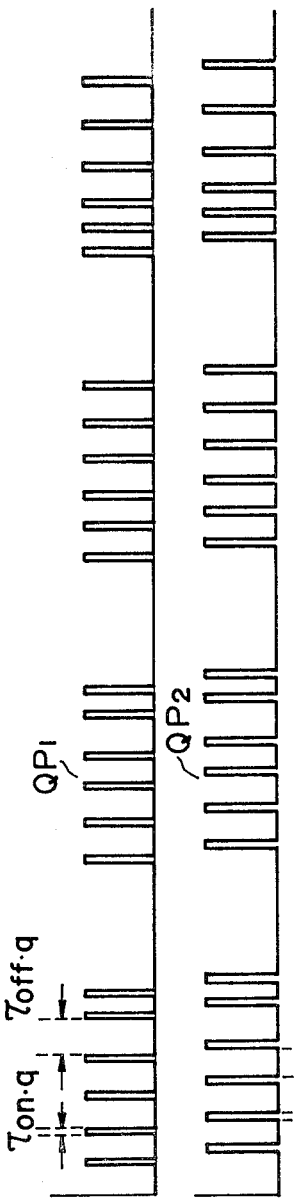
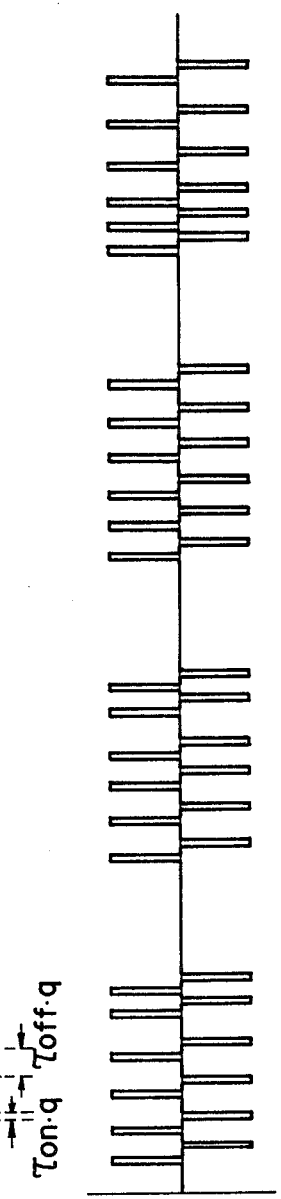
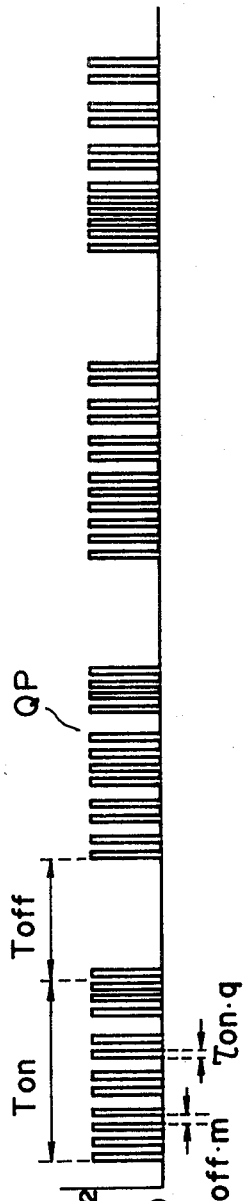

EDM PULSE FORMING CIRCUIT ARRANGEMENT AND METHOD

FIELD OF THE INVENTION

The present invention relates to an electrical-discharge-machining (EDM) method and system. In particular, it relates to a new and improved pulse supply method and apparatus for creating a sequence of time-spaced, discrete machining electrical discharges across an EDM gap.

BACKGROUND OF THE INVENTION

A typical EDM pulse supply in conventional use comprises a DC source and on-off controllable power switch, e.g. a bank of transistors, energized by signal pulses to periodically switch the DC source and to provide a sequence of EDM pulses of a preset duration $\tau$on and a preset interval $\tau$off across the gap formed between a tool electrode and a workpiece in the presence of a dielectric machining medium. The DC source comprises an input for receiving a single- or polyphase commercial AC supply and a transformer for transforming the commercial voltage to a desired machining voltage level. A rectifier is connected to provide a continuous and smoothened DC output from the transformed AC voltage. Machining power control may be effected by providing a saturable reactor in the AC circuit. The transformer and the saturable reactor operating at the commercial or low-frequency (i.e. 50 to 60 Hz) are large in capacity and size, large in power loss and also slow in response.

An improved EDM pulse supply makes use of a converter circuit which includes a rectifier directly connected to the AC supply to directly provide a DC output which is switched by a power switch to provide a sequence of high-frequency voltage pulses. A high-frequency transformer is included in the converter and can advantageously be small in size. Machining power control can simply be effected by adjusting the operating frequency of the converter, permitting the power unit to be compact and extremely small sized and affording a greatly reduced power loss. The high-frequency transformer has its output winding connected to the machining gap via a rectifies to apply a sequence of unidirectional machining pulses of a desired polarity and voltage level. A further power switch may be connected in the gap discharge circuit and can be periodically turned on and off to provide a sequence of machining pulses whose duration $\tau$on and interval $\tau$off are preset independently of the pulses which develop at the input side of the high-frequency transformer.

It is a critical requirement in a given EDM operation that each individual machining electrical discharge be strictly set as to its duration $\tau$on and interval $\tau$off in conformity with the tool and workpiece materials and other machining conditions and in accordance with the desired end results of the operation, e.g. the surface finish, removal rate and overcut. The duration $\tau$on and interval $\tau$off can be preset with each signal pulse produced in the switching control circuit for the power switch connected in circuit with the gap discharge circuit. It has been entirely common, therefore, in the prior art, regardless of different types of the power switching EDM pulse supply, to furnish the power switch with a sequence of switching signal pulses so that the DC source is switched on and each machining discharge occurs upon energization of the switch by each signal pulse and terminates upon termination of the signal pulse. Signal pulses are strictly preset as to their individual duration which determines the duration $\tau$on of individual machining discharge pulses. Since each switching signal pulse is preset and dimensioned to precisely determine the duration $\tau$on of each individual discharge, it is common knowledge that the switching and gap discharge circuit should be devoid of any impedance means, i.e. inductor and capacitor, including a stray inductance and capacitance, which tends to deform or distort the machining pulses. Thus, in every prior EDM power supply in which a sequence of machining discharge pulses are provided by the switching of a power switch, it has been commonly recognized to be essential that the switching be so sharp and the gap discharge circuit be so free from impedance means that each discharge pulse sharply develops and terminates, because if this fails, the duration of discharge pulses would undesirably deviate from the preset value. Such failure has also been believed to be disadvantageous since successive pulses tend to result in a continuous arcing—rather than be discrete as is essential—which would damage the machining operation.

In addition to the foregoing common knowledge of designing the pulsing circuitry in the prior EDM art, it should be pointed out that it is desirable that an EDM pulse supply unit be capable of providing various modified pulse formats to meet a wide ranges of machining requirements. For example, a pulse format has been known to be desirable which comprises a sequence of successive time-spaced groups of discrete, time-spaced machining discharge pulses. The number of machining pulses included in each train and the time interval between successive trains, together with the duration and/or interval of the machining pulses are preset to meet the particular requirement and may, together with or without a change of the duration and/or interval of the machining pulses, be varied in accordance with the machining gap condition or with the progress of the machining operation. A further modified pulse format, which has also be found to improve EDM processes, incorporates periodically a pulse of greater energy among a train of machining pulses of a preset energy or successive time-spaced trains of such machining pulses. The timing and energy parameters of such an energy-increased pulse may be controlled in response to the gap condition and/or in accordance with the machining progress. Furthermore, fine and ultra-fine EDM operatio require discharge pulses which in duration are narrow or ultra-narrow and yet are discrete and time-spaced. Here again, the duration and interval of such pulses should desirably be variably preset depending on particular machining settings and controlled with the machining progress. It can be seen, therefore, that a pressing demand exists for an EDM power supply which is fully versatile as to the pulse settability and controllability.

OBJECTS OF THE INVENTION

It is, accordingly, an important object of the present invention to provide a highly useful method of forming a sequence of desired machining discharge pulses and thereby, machining a workpiece based on a novel concept.

Another object of the invention is to provide an apparatus for carrying out the method described.

A further object of the invention is to provide a truly versatile EDM pulse supply which allows practically unlimited ranges of setting and controlling machining pulses with ease and reliability.

Still further object of the invention is to provide an improved EDM pulse forming circuit arrangement which is relatively simple, compact and efficient.

SUMMARY OF THE INVENTION

These and other objects which will hereinafter become more readily apparent are attained, in accordance with the present invention in a first aspect thereof, by a method of producing a series of discrete, time-spaced electrical discharges having a pulse duration $\tau$on and a pulse interval $\tau$off between a tool electrode and a conductive workpiece across a dielectric-filled machining gap to machine the workpiece, which method comprises the steps of: (a) providing on/off controllable power switch means energizable by a switching control circuit and having output terminals connected in circuit with a voltage supply and electrically coupled with the tool electrode and the workpiece via a gap discharge circuit; (b) generating at an input to the switching control circuit a succession of discrete and time-spaced quantum signal pulses having a quantum duration $\tau$on·q and a pulse interval $\tau$off·q, both of which are shorter than the pulse duration $\tau$on and interval $\tau$off; (c) gating, in the switching control circuit, the quantum signal pulses in succession for a time period Ton and with a time interval Toff to develop a series of time-spaced trains (Ton, Toff) of such successive, discrete quantum signal pulses ($\tau$on·q, $\tau$off·q) therein, the time period Ton and time interval Toff being longer than the duration $\tau$on·q and interval $\tau$off·q; (d) turning the power switch means on and off with the successive, time-spaced quantum signal pulses of the duration $\tau$·q and interval $\tau$off·q in each train (Ton) to develop a train (Ton) of successive, discrete output voltage pulses of the quantum duration $\tau$on·q and a short pulse interval from the voltage supply across the machining gap; and (e) providing impedance means in the gap discharge circuit such that the successive, discrete voltage pulses of the short pulse interval $\tau$off·q in a train result in a substantially continuous unitary, pulsed current flow through the machining gap within the time period Ton, constituting each individual machining electrical discharge of the duration $\tau$on.

Specifically, the cyclic period of the said successive trains may be predetermined and fixed; the sum of the time period Ton and time interval Toff is equal to the sum of the pulse duration $\tau$on and interval $\tau$off and may be predetermined and fixed over the successive trains. Further, each of the time period Ton and the time interval Toff may be predetermined and fixed over the successive trains.

Conveniently, also, the quantum duration $\tau$on·q and the interval $\tau$off·q can be predetermined and fixed over the successive quantum pulses, although it is possible to vary the quantum pulse frequency f in accordance with the gap condition. The pulse duration $\tau$on·q and interval $\tau$off·q of the quantum pulses should preferably be as small as 1 microsecond or less and may range between 0.1 and 5 microseconds, preferably not in excess of 2 microseconds.

The short interval between the adjacent output voltage pulses may be substantially equal to or less than the pulse interval $\tau$off·q. of the quantum signal pulses and may be substantially equal to the quantum duration $\tau$on·q. In no event should the short pulse interval be greater than the quantum duration $\tau$on·q or the pulse interval $\tau$off·q. between the adjacent quantum signal pulses.

The method according to the invention may in one form connect the power switch means with the voltage supply directly in series with the machining gap or in another form in series with the primary winding of a transformer whose secondary winding is connected via a rectifier to the machining gap. The power switch means is turned on and off with the successive, time-spaced quantum signal pulses of the duration $\tau$on·q and interval $\tau$off·q in each train (Ton) to develop a train (Ton) of the successive, discrete output voltage pulses of the quantum duration $\tau$on·q and the short time interval which is equal to the quantum interval $\tau$off·q from the voltage supply across the machining gap.

The power switch means may embody a pair of power switches, a first and a second switches, connected in parallel with each other and operable in an out of phase relationship. In step (b) two such successions of quantum signal pulses are then generated at two such inputs, respectively, in a mutually 180° out of phase relationship and in step (c) are gated for each common time period Ton with the common time interval Toff to develop two parallel streams of such trains simultaneously. The two separate streams of the quantum signal pulses occurring in the out of phase relationship in each train are applied to the first and second switches, respectively, so that the output voltage pulses in the two streams alternately develop in each train across the machining gap. Thus, the quantum signal pulses given at the input to the switching control circuit in a single format are doubled in each train to result in doubled output voltage pulses across the machining gap.

In a preferred mode of practicing the method, the two power switches and the voltage supply are so connected to the primary winding of the transformer that the parallel voltage pulses occur out of phase and with the opposite polarities at the transformer. Thus, the alternating voltage pulses develop and are rectified to develop the doubled output voltage pulses across the machining gap.

The invention also provides, in a second aspect thereof, a circuit arrangement for producing a series of discrete, time-spaced electrical discharges having a discharge duration $\tau$on and interval $\tau$off between a tool electrode and a conductive workpiece across a dielectric-filled machining gap to machine the workpiece, which arrangement comprises: on/off controllable power switch means energizable by a switching control circuit and having output terminals arranged in series with a voltage source and electrically coupled with the tool electrode and the workpiece via a gap discharge circuit; oscillator means for generating at an input to the switching control circuit a succession of discrete and time-spaced quantum signal pulses having a quantum duration $\tau$on·q and a pulse interval $\tau$off·q, both of which are less than the duration $\tau$on and interval $\tau$off; gating means in the switching control circuit for gating the quantum signal pulses in succession for a time period Ton and with a time interval Toff to develop a series of time-spaced trains (Ton, Toff) of such successive, discrete quantum signal pulses ($\tau$on·q, $\tau$off·q) therein, the time period Ton and time interval Toff being greater than the pulse duration $\tau$on·q and interval $\tau$off·q; means for turning the power switch means on and off with the successive, time-spaced quantum signal pulses of the duration $\tau_{on\text{-}q}$ and interval $\tau_{off\text{-}q}$ in each train (Ton) to develop a train (Ton) of successive, discrete voltage pulses of the quantum duration $\tau_{on\text{-}q}$ and a short time interval from the voltage supply across the machining gap; and impedance means in the gap discharge circuit dimensioned so that the successive, discrete voltage pulses in a train result in a substantially continuous unitary, pulsed current flow through the machining gap within the time period Ton, constituting each individual discrete machining electrical discharge of the duration $\tau_{on}$.

The circuit arrangement of the invention may in one form include the power switch means connected with the voltage supply directly in series with the machining gap or in another form in series with the primary winding of a high-frequency transformer whose secondary winding is connected via a rectifier to the machining gap. The means in the switching control circuit turns on and off the power switch means with the successive, time-spaced quantum signal pulses in each train to develop a train of the successive, discrete output voltage pulses of the quantum duration $\tau_{on\text{-}q}$ and the short time interval which is equal to the quantum interval $\tau_{off\text{-}q}$ from the voltage supply across the machining gap.

The power switch means may be a pair of power switches, a first and a second switch, connected in parallel with each other and operable in a mutually out of phase relationship. The oscillator means may be adapted to provide two successions of quantum signal pulses in a mutually 180° out of phase relationship. Such two successions of quantum signal pulses are gated by the gating means to result in two parallel streams of trains of quantum signal pulses which occur in the out of phase relationship in each train. These two parallel streams are applied to the first and second power switches, respectively, which are connected in parallel with each other in series with the voltage supply and the machining gap directly or the primary winding of the transformer whose secondary is connected via the rectifier to the machining gap. Thus, the quantum signal pulses produced at the oscillator means are doubled in each train to result in doubled output voltage pulses across the machining gap.

In a preferred form of the circuit arrangement of the invention, the two power switches and the voltage supply are so connected to the primary winding of the transformer that the parallel voltage pulses occur out of phase and with the opposite polarities at the transformer. Thus, the alternating voltage pulses develop and are rectified by the rectifier to develop across the machining gap the output voltage pulses doubled in number.

The voltage source comprises a DC voltage source which preferably comprises a rectifier connected directly or without the intermediary of any transformer to a single- or poly-phase commercial AC supply. No transformer of large size and capacity is required, unlike the conventional arrangement, to effect the required function of voltage transformation which is achieved by the high-frequency transformer of a small size and capacity incorporated in the output side of the power switch means.

BRIEF DESCRIPTION OF THE DRAWING

These and other features of the present invention as well as advantages thereof will become more readily apparent from the following description of certain preferred embodiments thereof made with reference to the accompanying drawing in which:

FIG. 2(A) through 2(G) are waveform diagrams illustrating waveforms of signals which appear at various portions of the circuit arrangement of FIG. 1;

FIG. 3 is a block diagram illustrating a modification of the switching control circuit for the power switching means which may be used in the circuit arrangement of FIG. 1;

FIGS. 4(A) through 4(E) are waveform diagrams illustrating waveforms of signals which develop at various portions of the circuit arrangement of FIG. 1 incorporating the modified switching control circuit of FIG. 3;

FIG. 6 is a block/circuit diagram illustrating a further EDM power supply system embodying the present invention;

SPECIFIC DESCRIPTION

Figure 1:
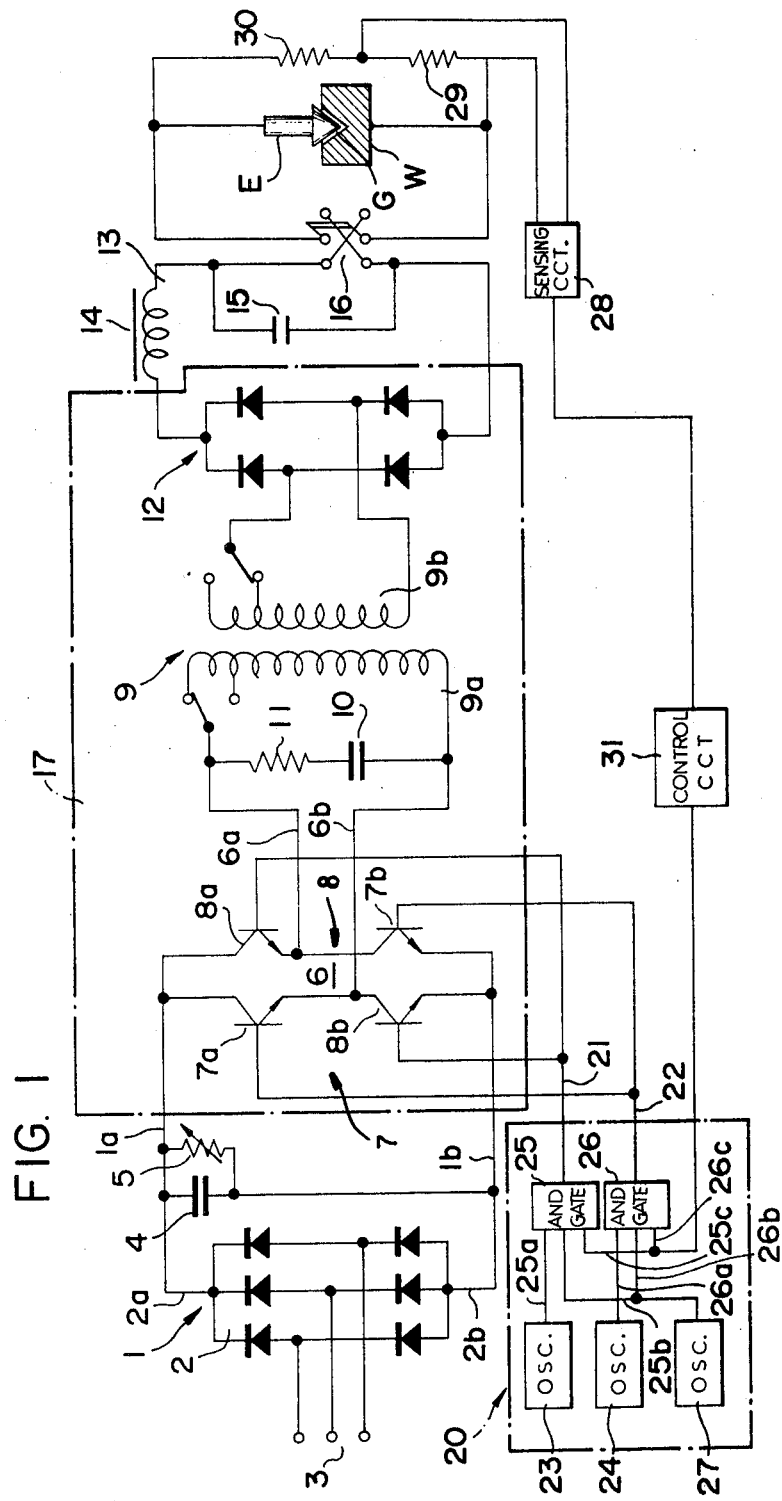
FIG. 1 is a circuit diagram illustrating one EDM pulse forming system embodying the principles of the present invention.

Referring first to FIG. 1, the circuit arrangement shown includes a DC voltage supply 1 which comprises a full-wave rectifier 2 directly connected to a three-phase commercial AC supply 3. No transformer is connected between the commercial AC supply 3 and the three-phase full-wave rectifier 2. The voltage supply 1 is completed with a smoothing capacitor 4 and an adjustable resistor 5, both connected in parallel with the output terminals of the rectifier 2.

A power switch 6 for pulsing the DC output of the voltage supply 1 comprises a pair of switches 7a, 7b and 8a, 8b connecting the output terminals 1a and 1b of the DC source 1 in series with the tapped primary winding 9a of a high-frequency transformer 9. A series network of a capacitor 10 and a resistor 11 is connected in parallel with the primary winding 9a to form a tank circuit therewith. The secondary winding 9b, which is also tapped, is connected to a full-wave rectifier 12 whose output terminals are connected in series with a tool electrode E and an electrically conductive workpiece W via a gap discharge circuit 13. The latter incorporates an inductor 14 and a capacitor 15 which may comprise stray inductance and capacitance included therein. A polarity-selection switch 16 is also included in the gap discharge circuit 13 to establish a desired polarity of the tool electrode E relative to the workpiece W. The gap discharge circuit 13 should be devoid of a resistive element and should limit the stray resistance to minimum.

The tool electrode E and workpiece W are arranged in an EDM machine and are spacedly juxtaposed to form a machining gap G therewith. The machining gap G is flooded with a liquid dielectric which may be a distilled water medium and may be supplied thereto from one or more nozzles (not shown) arranged in a region surrounding the machining gap. As EDM material removal from the workpiece W continues, the tool electrode E is advanced relatively towards or into the workpiece W to maintain the size of the machining gap G substantially constant. While the tool/workpiece arrangement is shown to be of the sinking type, any other EDM arrangement is, of course, applicable here and this may include a traveling-wire EDM system.

The power switches 7 and 8 comprises a pair of switching transistors 7a and 7b; and a pair of switching transistors 8a and 8b, respectively. Here, the transistors 7a and 8b and the transistors 8a and 7b in each set are connected in series with one another across the output terminals 1a and 1b of the voltage supply 1 while the junction of the transistors 8a and 7b and the junction of the transistors 7a and 8b are connected in series with the primary winding 9a of the transformer 9 and constitute output terminals 6a and 6b of the power switch unit 6.

The transistors 7a, 7b, 8a and 8b have their respective control terminals energized by a switching control circuit 20 via conductors 21 and 22. Specifically, the control terminals of the transistors 8a and 7b are arranged to be energized commonly with the conductor 21 and the control terminals of the transistors 7a and 7b are arranged to be energized commonly with the conductor 22.

The switching control circuit 20 includes a first oscillator 23 and a second oscillator 24 whose outputs feed into the first inputs 25a and 26a of AND gates 25 and 26, respectively. The first oscillator 23 is designed to provide a first succession of quantum signal pulses which individually have a minimum duration $\tau on\cdot q$ and are spaced from one another by a pulse interval $\tau off\cdot q$ as shown at FIG. 2(A). The second oscillator 24 is designed to provide a second succession of quantum pulses which have the same duration $\tau on\cdot q$ and interval $\tau off\cdot q$ and the same waveform as the first succession but are delayed by half a period, i.e. are in a 180° out of phase relationship with the first succession as shown at FIG. 2(B). The quantum duration $\tau on\cdot q$ ranges between 0.1 and 2 microseconds. The pulse interval $\tau off\cdot q$ may then range between 0.3 and 6 microseconds. A further oscillator 27 which operates at a preset frequency much lower than the frequency of the quantum signal pulses as shown at FIG. 2(C) are provided and feeds into the second inputs 25b and 26b of the AND gates 25 and 26. The oscillator 27 thus provides a series of pulses which have a preset longer pulse duration Ton ranging, say, between 2 microseconds and 10 milliseconds and are spaced from one another by a preset longer pulse interval Toff ranging, say, between 2 microseconds and 50 milliseconds.

The third inputs 25c and 26c of the AND gates 25 and 26 are arranged to be derived from the machining gap G. To this end, a sensing circuit 28 has its input terminals connected across a sensing resistor 29 which is in turn connected in series with a resistor 30 across the tool electrode E and the workpiece W. The sensing circuit 28 is designed to monitor the gap condition and may be arranged to respond to the gap voltage, current and/or the magnitude of high-frequency components in each individual gap machining pulse. A control circuit 31 is connected to the output of the sensing circuit 28 and operates, when the latter indicates that the gap condition is satisfactory, to furnish the third inputs 25c and 26c of the AND gates 25 and 26 with an "OK" or "1" signal as shown at FIG. 2(D). When the gap state is found to be bad, a "NG" (no good) or "0" signal develops at the inputs 25c and 26c of the AND gates 25 and 26. Thus, only while the machining gap is in a normal condition are the AND gates 25 and 26 enabled. Typically, the gap "OK" condition persists for a relatively long time duration over several machining pulses.

In the arrangement so far described, assume that the AND gates 25 and 26 are both enabled with their third inputs 25c and 26c furnished with the "1" signal in response to the gap normality. Then, the AND gate 25 is enabled to respond through its first input 25a to a first succession of quantum signal pulses QP1, shown at FIG. 2(A), incoming from the oscillator 23 and through its second input 25b to a train of gating signal pulses GP, shown at FIG. 2(C), incoming from the oscillator 27. As a result, a series of time-spaced trains (Ton, Toff) of the quantum signal pulses QP1 ($\tau on\cdot q$, $\tau off\cdot q$) develops through the output conductor 21 to turn on and off the transistors 8a and 8b in synchronism therewith. Meanwhile, the AND gate 26 is enabled to respond through its first input 26a to a second succession of quantum signal pulses QP2, shown at FIG. 2(B), incoming from the oscillator 24 and through its second input 26b to a train of the gating pulses GP (FIG. 2(C)) from the oscillator 27. As a result, a series of the time-spaced trains (Ton, Toff) of the quantum signal pulses QP2 ($\tau on\cdot q$, $\tau off\cdot q$) develops through the output conductor 22 to turn on and off the transistors 7a and 8b in synchronism therewith. It will be seen that in each train Ton, the quantum signal pulses GP1, and QP2 occur alternately to pulse the DC output appearing at the output terminals 1a and 1b of the voltage supply 1 with opposite polarities. Thus, in each time period Ton, a train of alternating voltage pulses of a pulse duration $\tau on\cdot q$ and a pulse interval $\frac{1}{2}$ ($\tau off\cdot q - \tau on\cdot q$) develops at the primary winding 9a of the transformer 9 and it assumes a waveform as shown at FIG. 2(E) across the secondary winding 9b. The tapped secondary 9b is connected via the full-wave rectifier 12 to the tool electrode E and the workpiece W. With negative going components reversed by rectification, the voltage output assuming a waveform as shown at FIG. 2(F) ultimately develops across the machining gap G. It is seen that the ultimate voltage output comprises a series of time-spaced trains (Ton, Toff) of discrete voltage pulses QP having the quantum pulse duration $\tau on\cdot q$. In each train Ton, there exist the discrete output quantum voltage pulses whose number is twice the number of quantum signal pulses included in the succession generated by each of the oscillators 23, 24 in the switching control circuit 20. The output quantum voltage pulses QP have individually the quantum pulse duration $\tau on\cdot q$ and are spaced apart from one another by a minimum short interval $\tau off\cdot m$ which is equal to $\frac{1}{2}$ ($\tau off\cdot q$, $\tau on\cdot q$). The pulse interval $\tau off\cdot m$ is so short and the impedance 14, 15 in the gap discharge circuit 13 is so dimensioned that the successive quantum voltage pulses PQ in each train result in a substantially continuous, unitary and pulsed current DP flowing through the machining gap G within the time period Ton, constituting each individual machining electrical discharge of a duration $\tau on$. In each train, a dielectric gap breakdown establishes a discharge column bridging the tool electrode and the workpiece across the machining gap. Within the time period Ton, one discrete quantum voltage pulse is followed by the next while the gap remains ionized, sustaining the discharge column once established. The discharge column is sustained by the successive quantum voltage pulses until the period Ton is timed out or the last quantum voltage pulse terminates. Within each time period Ton, the gap breakdown will be created with the first quantum voltage pulse but may entail a delay τD of an extremely short time period which is equal to Ton minus τon. The pulse interval τoff between successive unitary discharges DP is expressed by τD plus Toff. Thus, the sum τon plus τoff becomes always equal to the sum Ton plus Toff.

In the arrangement of FIG. 1, it should be noted that a plurality of converter circuits 17, each comprising a power switch 6, transformer 9 and rectifier 12 and assembled as a unit, may be provided for connection in parallel with one another between the voltage supply 1 and the gap discharge circuit 13 to enhance a power efficiency. Each such converter 17 includes a pair of input terminals connected respectively to the output terminals 1a and 1b of the DC voltage supply 1, a pair of control input terminals connected respectively to the conductors 21 and 22, and a pair of output terminals connected in series with the gap discharge circuit 13. The number of such parallel converters 17 is given in accordance with a desired value of the peak current Ip of the discharge machining pulses produced in the manner so far described.

FIG. 3 shows a modified switching control circuit 20 for controlling the power switch 6 in the circuit arrangement of FIG. 1. The circuit 20 includes a V-F (voltage-to-frequency) converter 32 which provides a succession of quantum signal pulses QP whose frequency f or pulse interval τoff·d varies as a function of a gap signal detected by a sensing circuit 33 connected to the tool electrode E and the workpiece W. The converter 32 is also fed with a series of gating pulses of a duration Ton and an interval Toff from an oscillator 34 so that a first succession of time-spaced trains (Ton, Toff) of quantum signal pulses QP1 of a quantum duration τon·q and an interval τoff·q as shown at FIG. 4(B) is issued from the output thereof into the conductor 21 which feeds into the control terminals of the switching transistors 8a and 7b in FIG. 1. The oscillator 34 may be responsive to a gap signal from the sensing circuit 33 to allow the duration Ton and/or Toff to be varied in accordance with the condition of the machining gap G. The output of the V-F converter 32 is also connected to a delay circuit 35 which is designed to delay the individual quantum signal pulses by half a period so as to issue a second succession of time-spaced quantum signal pulses QP2 as shown at FIG. 4(C) into the conductor 22 which feeds into the control inputs of the switching transistors 7a and 7b in FIG. 1. Here again, the transistors 8a and 7b are turned on and off with the first succession of quantum signal pulses QP1 and the transistors 7a and 7b are turned on and off with the second succession of quantum signal pulses QP2 to provide at the transformer 9 a series of time-spaced trains of alternating quantum voltage pulses as shown at FIG. 4(D). The ultimate voltage output which develops at the output of the rectifier 12 across the machining gap G assumes a waveform as shown at FIG. 4(E). It is seen that in each time period Ton the output quantum voltage pulses of the fixed quantum duration τon·q occurs with the pulse interval τoff·m varying in accordance with the gap signal. The frequency :2f of quantum voltage pulses QP in each train Ton may be varied in a fixed range, say, between 200 kHz and 2 MHz. The V-F converter 32 should then be adapted for a frequency change between 100 kHz and 1 MHz.

Figure 5:
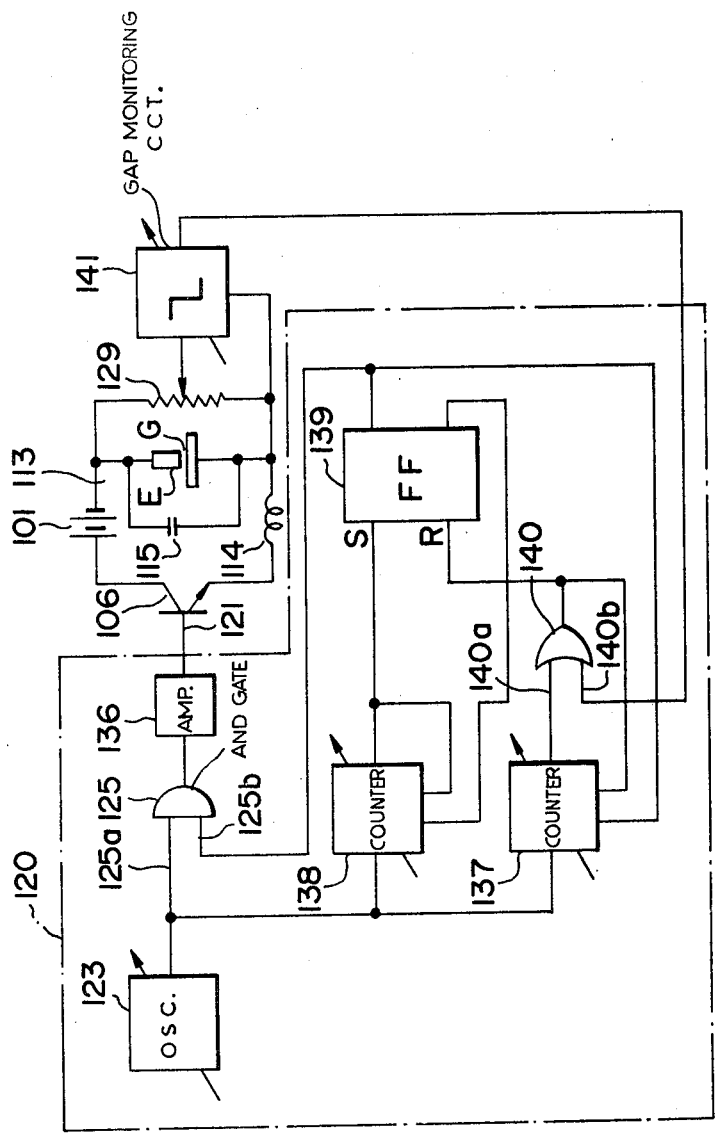
FIG. 5 is a circuit diagram illustrating another EDM pulse forming circuit embodying the present invention in which the power switch means is connected in series with a DC voltage supply and the machining gap.

The circuit arrangement of FIG. 5 includes a power switch 106 in series with a DC voltage source 101 and the machining gap G formed between the tool electrode E and the workpiece W in a gap discharge circuit 113 containing an inductance 114 and a capacitance 115 therein. The power switch 106 constituted by a bank of transistors is energized through a conductor 120 by a switching control circuit 121 which includes an oscillator 123 providing a succession of quantum signal pulses QPo of a quantum duration τon·q and a pulse interval τoff·q to the first input 125a of an AND gate 125. The output of the AND gate 125 is connected via an amplifier 136 to the conductor 121.

In the embodiment of FIG. 5 a pair of counters 137 and 138 are provided to define the time period Ton and the time interval Toff, respectively, of gating signal pulses GP for the quantum signal pulses QPo. Thus, the counter 138 is connected to the output of the oscillator 123 to count quantum signal pulses QPo and, when the count reaches a predetermined value defining the time interval Toff, to bring a flip-flop circuit 139 into a set state while resetting itself. The flip-flop 139 when set initiates a gating pulse GP which is applied to the AND gate 125 through its second input 125b to gate quantum signal pulses incoming through its first input 125a. The flip-flop 139 when set also causes the counter 137 to initiate counting quantum signal pulses QPo from the oscillator 123. When the count reaches a predetermined value defining the time period Ton, the counter 137 is reset while bringing the flip-flop 139 into a reset state. The flip-flop 139 when reset terminates the gating pulse GP which has allowed the quantum signal pulses from the oscillator 123 to pass through the AND gate 125. When reset the flip-flop 139 simultaneously causes the counter 138 to initiate counting quantum signal pulses from the oscillator 123. It is seen therefore that a series of time-spaced trains (Ton, Toff) of quantum signal pulses (τon·q, τoff·q) here again develops at the output of the AND gate 125 to turn the power switch 106 on and off therewith. This causes a series of quantum output voltage pulses QP of the quantum pulse duration τon·q and the quantum pulse interval τoff·q to develop from the voltage supply 101 across the machining gap G. Here again, the quantum pulse interval τoff·q is so short and the gap discharge circuit 113 is designed to contain impedances 114 and 115 such that the successive discrete quantum voltage pulses QP result in a substantially continuous, unitary and pulsed current flowing through the machining gap within the time period Ton, constituting each individual machining electrical discharge of a duration τon which is substantially equal to the time period Ton.

The switching control circuit 120 of FIG. 5 is also shown to include an OR gate 140 which has its output terminal connected to the reset terminal of the flip-flop 139 and its first input terminal 140a connected to the output of the counter 137. The OR gate 140 here has its second terminal 140b leading from a gap monitoring circuit 141 responsive to a voltage signal which develops across a sensing resistor 129 connected across the tool electrode E and the workpiece W. The gap monitoring circuit 141 monitors the gap discharge voltage VG and, when it falls below a predetermined threshold level, issues a "1" signal. When this signal is applied to the OR gate 140, the flip-flop 139 is reset even though the counter 137 is still counting i.e. the predetermined time period Ton has not yet been timed out. Thus, the unitary discharge ends and the discharge interval commences earlier than the preset time instant. The next unitary discharge commences after the expiration of the time interval Toff which is fixed. In this arrangement, it can be seen that there will occur no substantial change in the time interval Toff.

With this arrangement it is thus possible to reduce the discharge interval τpff to a minimum value required in accordance with the preselected setting of machining to be conducted while the discharge duration is allowed to vary adaptively to the discharge state which varies from one discharge to the next. It has been found to be especially important in the EDM process to hold the surface of the workpiece free from the deposit of a thermal reaction product which tends to form thereon from the machining liquid. For example, using a hydrocarbon such as kerosene as the liquid dielectric, a thermally decomposed graphite or carbon or carbide tends to build up on the workpiece surface. Using a water liquid as the liquid dielectric, a layer of metal oxide tends to build up on the workpiece surface. Such a deposit either cannot be destroyed by a subsequent discharge or would entail excessive discharge energy. It has now been discovered that with a build-up of the deposit, the discharge voltage in each pulse falls below a threshold level which is a function of electrode and workpiece materials as well as discharge pulse parameters. For example, the following threshold value have been determined:

| Electrode (+) | Workpiece (−) | Pulse Parameters | Threshold Level |
|---|---|---|---|
| Cu | Fe | $Ip = 30$ A, $\tau on.q = 1\mu s$ | 21 volts |
| CuC | Fe | $Ip = 30$ A, $\tau on.q = 1\mu s$ | 24 |
| CuC | FeC | $Ip = 30$ A, $\tau on.q = 1\mu s$ | 31 |
| Cu | Fe | $Ip = 50$ A, $\tau on.q = 5\mu s$ | 18 |
| CuC | Fe | $Ip = 50$ A, $\tau on.q = 5\mu s$ | 29 |
| CuC | FeC | $Ip = 50$ A, $\tau on.q = 5\mu S$ | 26 |

Accordingly, the threshold setting is made in the sensing circuit 141 according to the particular machining setting so as to provide the "1" output and apply it to the OR gate 140 whereby to terminate the unitary discharge DP when the gap voltage falls below the particular threshold level.

FIG. 6 shows a highly versatile EDM pulse supply system embodying the present invention. In this system, as in FIG. 5, a power switch 206 is connected in series with a DC voltage supply 201 and the machining gap G. The resistance of the switch 206 is indicated at 206a and the impedance of the gap discharge circuit 213 is not shown. The system, here too, comprises an oscillator 223 which generates a succession of quantum signal pulses QPo of a pulse duration τon·q and a pulse interval τoff·q which are fed into an AND gate 225 through a first input 225a thereof.

Quantum signal pulses are also fed into a counter 237 for counting thereby. When its count reaches a predetermined value defining a time interval Toff, the counter 237 issues a "D" signal. The counter 237 is arranged to continue to issue the "0" signal until it is reset by a further counter not shown or one to be described, which defines a time duration Ton. The counter 237 thus generates through its output 237d a series of pulses A of the duration Ton and the interval Toff where Ton, Toff is greater than τon·q, τoff·q. These latter pulses are fed into the AND gate 225 through second input 225b thereof. As a result, a series of time-spaced trains (Ton, Toff) of quantum signal pulses (τon·q, τoff·q) are issued from the output 225d of the AND gate 225 and are indicated by QP. The counter 237 has its count saturation presettable as desired so that the time period or pulse duration Ton can adjustably be preset as desired.

Quantum signal pulses from the oscillator 223 are also fed into a frequency divider 242 which through its output 242d provides a series of narrow pulses B of a duration which may be as narrow as the quantum duration τon·q but of a cyclic period which is greater than and a multiple of the cycling period of the quantum signal pulses. The frequency divider 242 has its frequency setting adjustable to allow the output pulse interval to be adjustably preset as desired. The pulses B are fed into an AND gate 243 through a first input 243a thereof and also into further counters 244 and 245, each of which has its count saturation setting adjustably preset. The counter 245 is used to reset the counter 237.

The counter 245 resets the counter 237 when it counts up a predetermined number of the pulses B which defines the time duration Ton of the pulses A. The counter 244 is reset when the counter 237 upon resetting develops the "1" signal at its output 237d. The counter 244 is then allowed to count the pulses B incoming from the frequency-divider 242. Each time the counter 244 counts up a predetermined number of the pulses B, it has at its output 244d; a "1" signal. Thus, a series of wide pulses C is issued from the output 244d of the counter 244 and applied to the AND gate 243 through the second input 243b. Each wide pulse C then serves to gate narrow pulses B whereby to allow a succession of periodically interrupted pulses D which comprises groups (C) of narrow pulses B to develop through the output 243d of the AND gate 243. The outputs 243d of the AND gate 243 and the output 225d of the AND gate 225 are arranged to feed into an OR gate 246 having an output 246d.

The output 237d of the counter 237, the output 225d of the AND gate 225, the output 246d of the OR gate 246, the output 242d of the frequency divider 242, the output 243d of the AND gate 243 and the output 244d of the counter 244 are shown connected via switches 247, 248, 249, 250, 251 and 252, respectively, to the conductor 221 which feeds into the control terminals of the power switch 206. The switches 247–252 are selectively actuated and closed according to the requirement for the particular format and ranges of the pulse duration and interval of machining voltage pulses to be applied across the machining gap.

With the switch 248 closed, the switching signal pulses QP develop at the control input 221 for the power switch 206 to turn on and off the latter therewith so that a series of time-spaced trains (Ton, Toff) of discrete quantum voltage pulses (τon·q, τoff·q) develop across the tool electrode E and the workpiece W and these voltage pulses in each train, as has been described, result in a substantially continuous, unitary and pulses current flow through the machining gap G within the time period Ton, constituting each individual machining discharge pulse of a desired duration τon.

The switch 247 may be closed to turn the power switch 206 on and off simply with the signal pulses A. The switch 252 may be closed when a series of machining voltage pulses of a pulse duration and interval in a wider range corresponding to the signal pulses C preset in the counter 244 is required. The output 244d of the counter 244 may be connected to the AND gate 225 through a further input thereof via a switch which may be closed together with the switch 248 while the second input 225b is disconnected from the output 237d of the counter 237. Then the signal pulses C act as a gating signal for the quantum signal pulses QPo just as do the signal pulses A and a series of unitary machining pulses, each of which is integrated from the quantum pulses but which have a discharge duration τon and interval τoff in the wider range preset with the signal pulses C, develops across the machining gap G.

With the switch 250 closed, narrow signal pulses B appear at the input 221 for the power switch 206 to apply across the machining gap G a uniform succession of narrow machining voltage pulses which is suitable for fine or ultrafine EDM operation and whose pulse duration and interval are preset in the oscillator 223 and the frequency divider 242.

The switch 251 may be closed to provide a succession of periodically interrupted or occuring groups of narrow machining pulses of a pulse format D which individually have the pulse duration and interval preset with the signal pulses B while the duration of the invididual groups and their interval are preset with the signal pulses C. The narrow machining voltage pulses produced across the machining gap corresponding to the signal pulses B, whether they are uniformly successive or intermittently interrupted are sufficiently spaced apart with one another by the pulse interval, so that the resulting discharges here do not become continuous but retain their discreteness.

Figure 8A:
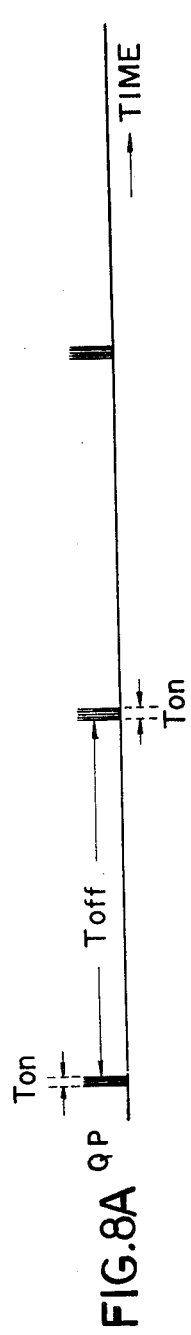
FIGS. 8(A)–8(C) show waveforms of signals which develop at portions of the circuit arrangement of FIG. 6
Figure 8B:

Finally, it should be noted that the closure of the switch 249 produces a highly advantageous format of gap discharge pulses. The power switch 206 then is made responsive to the switching signal developed at the output 246d of the OR gate 246. The first input 246a of the OR gate 246 is fed with the signal pulses QP as shown at FIG. 8(A). As described before, the pulse format QP comprises a series of time-spaced trains of quantum pulses which trains have the duration Ton and interval Toff defining the duration τon and interval τoff of the eventual discharge pulses. The quantum pulses have the duration τon-q and interval τoff-q. The second input 246b of the OR gate 246 is fed with the signal pulses D as shown at FIG. 8(B). The pulse format D comprises a series of time-spaced groups of narrow pulses shown as single pulses) which may have a duration equal to the duration τon-q of the quantum pulses but have an interval much greater than the quantum pulse interval τoff-q, the groups being shown as having a duration T1 and interval T2. It can be seen that the sum of T1 and T2 is equal to the sum of Ton and Toff.

Figure 8C:
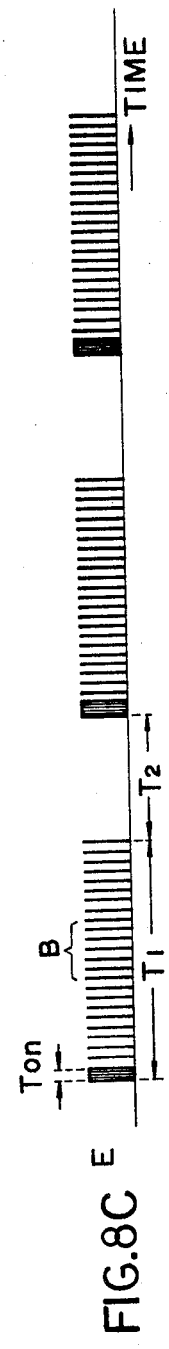

Thus, at the output 246d of the OR gate 246, it can be seen that during the time period (T1+T2) there develop first the quantum signal pulses QPo from the oscillator 223 and the narrow pulses B from the frequency divider 242 simultaneously until the time period Ton runs out. Whereupon, the quantum signal pulses QPo are disabled to pass through the gate 225 and the frequency divider 242 continues to furnish the narrow pulses B through the gate 243 until the time period T1 expires. Then the narrow pulses B are disabled to pass through the gate 243 and the off-time period T2 commences. The off-time period T2 continues while the counter 245 is counting the narrow clock pulses B from the frequency divider 242. Upon expiration of the time period T2, the time periods Ton and T1 simultaneously commence. The time period T1 continues while the counter 244 is counting the narrow clock pulses B from the frequency divider 242. Thus, there develops a sequence of the pulse format E, as shown at FIG. 8(C), at the input 221 to the power switch 206. The switch 206 is turned on and off to provide machining pulses of the waveform precisely corresponding to the pulse format E.

It has been discovered that the pulse format E offers greater advantages over the pulse format D. For example, in the pulse format D, the pulse duration and interval may be 3 and 4 microseconds, respectively while the time periods T and T2 may be 1 millisecond and 500 microseconds, respectively. With the peak current Ip of the discharges fixed at 10 amperes, the removal rate is obtainable which is at most 0.11 mm/min at the initial unstable machining stage and at most 0.28 mm/min at the subsequent stabilized machining stage of a given machining operation. When, however, there is included in each group of the narrow pulses D a long pulse QP which includes 15 quantum pulses of the duration τon-q of 3 microseconds with the interval τoff-q of 1 microsecond to form a single unitary discharge pulse of a duration τon of 100 microseconds and the quantum pulses are set to have the peak current of 10 amperes, it has been found that an increased removal rate is obtained which amounts to 0.26 mm/min at the initial stage and to 32 mm/min at the subsequent stage of the same machining operation.

Figure 7:
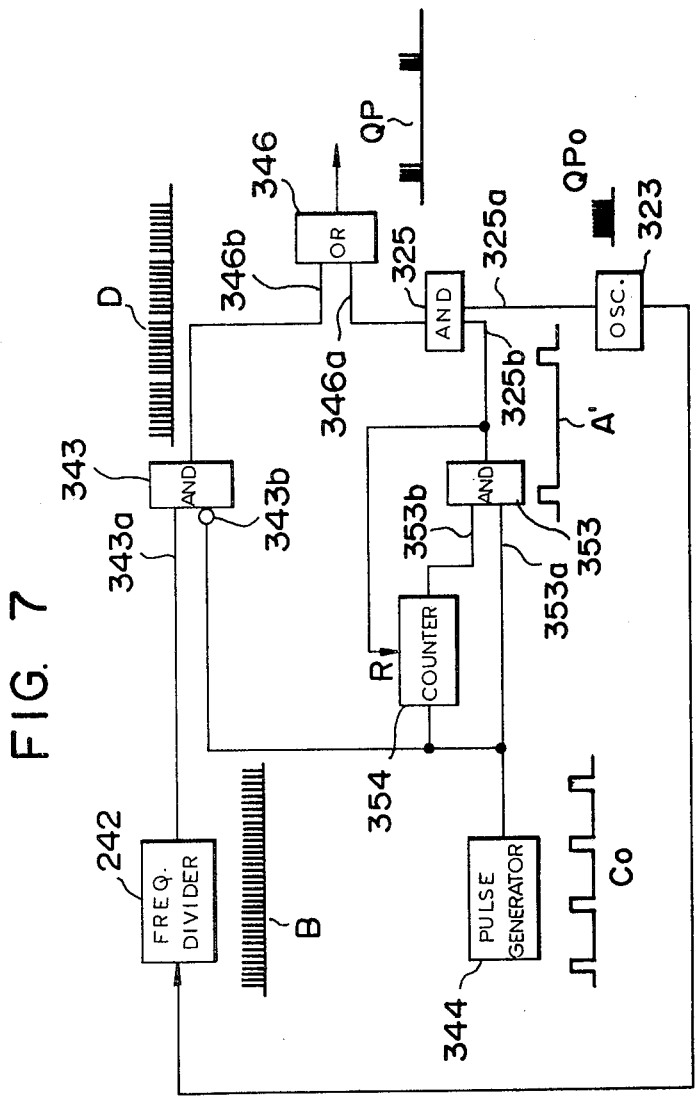
FIG. 7 is a block/circuit diagram of a further circuit arrangement embodying the present invention.
Figure 8D:
FIG. 8(D) is a waveform diagram of a pulse format produced by the circuitry of FIG. 7.

A further circuit arrangement as shown in FIG. 7 may be employed to provide a pulse format F as shown at FIG. 8(D) in which the peculiar long pulse is included in every fourth and, more generally, every n-th of narrow pulses in a group. In this embodiment an oscillator 323 generates a succession of quantum signal pulses QPo and applies it to a first input 325a of AND 325 which in turn feeds into a first input 346a of an OR gate 346. The quantum signal pulses QPo are also fed to a frequency divider 242 to result in a succession of narrow signal pulses B with a greater pulse interval. These latter signals B are fed into a first input 343a of an AND gate 343 which in turn feeds into a second input 346b of the OR gate 346. The second input 343b of the AND gate 343 includes a NOT gate or inverter fed with signal pulses Co provided by a pulse generator 344 which may correspond to the AND gate 243 in the circuit arrangement of FIG. 6. The signal pulses Co upon phase reversal by the inverter 343b are fed through the AND gate 343 whereby to gate the narrow pulses B from the frequency divider 342 to allow the pulse format D to develop and to feed into the OR gate 356. The signal pulses Co are also fed to a first input 353a of a further AND gate 353 and to the input of a counter 354 whose output 353b feeds into a second input of the AND gate 353. The output of the latter feeds into a second input 325b of the AND gate 325.

The counter 354 operates to count the signal pulses Co from the pulse generator 344 and, when its count reaches a preset value, to issue a gating signal to the AND gate 353. The latter thus issues a series of pulses Ao having a cyclic period which is a multiple n of the pulses Co, and, upon issuance of every A' pulse, resets the counter 354. The quantum signal pulses QPo from the oscillator 323 coming into the AND gate 325 are gated by the pulses A' to result in a pulse format QP. Accordingly the OR gate 346 responding to both the pulses D and the pulses QP provides the pulse format F shown at FIG. 8(D).

What is claimed is:

1. A method of producing a series of discrete, time-spaced electrical discharges having a discharge duration τon and interval τoff between a tool electrode and a conductive workpiece across a dielectric-filled machining gap to machine the workpiece, the method comprising the steps of:

(a) providing on/off controllable power switch means energizable by a switching control circuit and having output terminals arranged in circuit with a voltage source and electrically coupled with the tool electrode and the workpiece via a gap discharge circuit;

(b) generating at an input to said switching control circuit a succession of discrete and time-spaced quantum signal pulses having a quantum duration τon·q and a pulse interval τoff·q, both of which are less than the duration τon and interval τoff;

(c) gating, in said switching control circuit, said quantum signal pulses in succession for a time period Ton and with a time interval Toff to develop a series of time-spaced trains (Ton, Toff) of such successive, discrete quantum signal pulses (τon·q, τoff·q) therein, said time period Ton and time interval Toff being greater than said quantum pulse duration τon·q and interval τoff·q;

(d) turning said power switch means on and off with said successive, time-spaced quantum signal pulses of the duration τon·q and interval τoff·q in each train (Ton) to develop a train (Ton) of successive, discrete output voltage pulses of the quantum duration τon·q and a short time interval from said voltage supply across said machining gap; and (e) providing impedance means in said gap discharge circuit such that said successive discrete voltage pulses of the short pulse interval in a train result in a substantially continuous unitary, pulsed current flow through the machining gap within said time period Ton, constituting each individual machining electrical discharge of said duration τon.

2. The method defined in claim 1 wherein the sum of Ton and Toff is equal to the sum of τon and τoff for each discharge cycle.

3. The method defined in claim 1 or claim 2 wherein each of the time period Ton and the time interval Toff are predetermined and fixed over said successive trains.

4. The method defined in claim 1 wherein said short pulse interval of the output voltage pulses is equal to said pulse interval τoff·q of the quantum signal pulses.

5. The method defined in claim 4 wherein the output terminals of said power switch means are connected in series with said voltage source, said tool electrode and said workpiece.

6. The method defined in claim 1 wherein said short pulse interval of the output voltage pulses is less than said pulse interval τoff·q of the quantum signal pulses.

7. The method defined in claim 1 wherein said succession of discrete and time-spaced quantum signal pulses have a frequency proportional to an analog signal derived from the machining gap.

8. The method defined in claim 1, further comprising the steps of detecting a gap voltage of said individual machining electrical discharge and terminating said time period Ton upon said detected gap voltage falling below a predetermined value.

9. The method defined in claim 8 wherein said time interval is fixed.

10. The method defined in claim 1, further comprising the steps of applying a sequence of time-spaced groups of machining pulses between the tool electrode and the workpiece and incorporating said individual machining discharges among said machining pulses.

11. A circuit arrangement for producing a series of discrete, time-spaced electrical discharges having a discharge duration τon and interval τoff between a tool electrode and a conductive workpiece across a dielectric-filled machining gap to machine the workpiece, the arrangement comprising:

on/off controllable power switch means energizable by a switching control circuit and having output terminals arranged in series with a voltage source and electrically coupled with the tool electrode and the workpiece via a gap discharge circuit;

oscillator means for generating at an input to said switching control circuit a succession of discrete and time-spaced quantum signal pulses having a quantum duration τon·q and a pulse interval τoff·q, both of which are less than the duration τon and interval τoff;

gating means in said switching control circuit for gating said quantum signal pulses in succession for a time period Ton and with a time interval Toff to develop a series of time-spaced trains (Ton, Toff) of such successive, discrete quantum signal pulses (τon·q, τoff·q) therein, said time period Ton and time interval Toff being greater than said pulse duration τon·q and interval τoff·q;

means in said switching control circuit for turning said power switch means on and off with said successive, time-spaced quantum signal pulses of the duration τon·q and interval τoff·q in each train (Ton) to develop a train (Ton) of successive, discrete output voltage pulses of the quantum duration τon·q and a short time interval from said voltage supply across said machining gap; and impedance means in said gap discharge circuit dimensioned so that said successive, discrete voltage pulses of the short interval in a train result in a substantially continuous unitary, pulsed current flow through the machining gap within said time period Ton, constituting each individual machining electrical discharge of the duration τon.

12. The arrangement defined in claim 11 wherein said power switch means is connected in series with said voltage source and said machining gap.

13. The arrangement defined in claim 11, further comprising a transformer having a primary winding connected in series with said voltage source and said power switch means and a rectifier connected between a secondary winding of said transformer and said machining gap.

14. The arrangement defined in claim 13 wherein said power switch means comprises a pair of power switches each of which connects the output of said voltage source to said primary winding of the transformer so as to allow an output current of said voltage source to pass therethrough in opposite directions; said oscillator means comprises a pair of pulse sources, one of which generates a first stream of such a succession of quantum signal pulses and the other of which generates a second stream of such a succession of quantum signal pulses which have the duration τon·q and interval τoff·q identical to those in said first stream but are shifted by half a period therefrom; said gating means is adapted to gate said first and second streams of quantum signal pulses and to turn on and off said first and second switches with said quantum signal pulses in said first and second streams, respectively, within said time period Ton, thereby permitting alternating voltage pulses to develop within said each time period Ton at said transformer; and said rectifier is adapted to rectify said alternating voltage pulses whereby to develop said train (Ton) of successive discrete output voltage pulses of the quantum duration $\tau on \cdot q$ and the short time interval across said machining gap, said output voltage pulses having a frequency twice as high as the frequency of each of said first and second stream of quantum signal pulses.

15. The arrangement defined in claim 14 wherein said voltage source is a DC source and comprises rectifier means connected, without intermediary of a transformer, to a commercial AC supply.

16. The arrangement defined in claim 15 wherein said primary winding of the transformer has a tank circuit including a capacitor connected in parallel therewith.

17. The arrangement defined in claim 15 wherein said power switch means, said transformer and said rectifier are to form a circuit unit and a plurality of such circuit units are arranged for selective connection between the output terminals of said voltage source and the input terminals of said gap discharge circuit to establish a particular current magnitude of said machining electrical discharges.

18. The arrangement defined in claim 17, further comprising sensing means responsive to a condition of the machining gap for controlling at least one of said time period Ton and said time interval Toff.

19. The arrangement defined in claim 18 wherein said sensing means is adapted to respond to a gap voltage of each individual machining electrical discharge for controlling the timing of the termination of said time period Ton upon the detected gap voltage falling below a predetermined threshold value while holding said time interval Toff at a fixed value.

20. The arrangement defined in claim 11, further comprising sensing means for deriving from said machining gap an analog signal representing the condition of said machining gap and acting on said oscillator means to generate quantum signal pulses at a frequency proportional to said analog signal.

* * * * *